United States Patent
Chang et al.

(10) Patent No.: US 9,823,122 B2
(45) Date of Patent: Nov. 21, 2017

(54) COMPUTING DEVICE AND METHOD FOR DETECTING LIGHTNESS OF LIGHTING DEVICE

(71) Applicant: Shenzhen Airdrawing Technology Service Co., Ltd., Shenzhen (CN)

(72) Inventors: Chih-Kuang Chang, New Taipei (TW); Xin-Yuan Wu, Shenzhen (CN); Lu Yang, Shenzhen (CN)

(73) Assignee: Shenzhen Airdrawing Technology Service Co., Ltd., Shenzhen (CN)

( * ) Notice: Subject to any disclaimer, the term of this patent is extended or adjusted under 35 U.S.C. 154(b) by 268 days.

(21) Appl. No.: 14/589,628

(22) Filed: Jan. 5, 2015

(65) Prior Publication Data

US 2016/0127662 A1    May 5, 2016

(30) Foreign Application Priority Data

Oct. 31, 2014 (CN) .......................... 2014 1 0606857

(51) Int. Cl.
| | |
|---|---|
| *H04N 5/341* | (2011.01) |
| *G01J 1/44* | (2006.01) |
| *G01J 1/02* | (2006.01) |
| *G01J 1/42* | (2006.01) |

(52) U.S. Cl.
CPC .............. *G01J 1/44* (2013.01); *G01J 1/0228* (2013.01); *G01J 1/4228* (2013.01); *G01J 2001/4252* (2013.01)

(58) Field of Classification Search
CPC .............................. G06F 3/0425; G06F 3/0428
See application file for complete search history.

(56) References Cited

U.S. PATENT DOCUMENTS

| | | | |
|---|---|---|---|
| 7,009,739 B1* | 3/2006 | Lin ..................... | H04N 1/40012 358/1.9 |
| 2010/0183224 A1* | 7/2010 | Park ....................... | G06T 5/009 382/169 |
| 2014/0234994 A1* | 8/2014 | Abe .................... | G01N 21/6489 438/16 |

OTHER PUBLICATIONS

Kojima Takayoshi,Digital Camera, Control Method and Control Program Thereof, Sep. 2, 2005, JP-2005236375.*

* cited by examiner

*Primary Examiner* — MD Haque
(74) *Attorney, Agent, or Firm* — ScienBiziP, P.C.

(57) ABSTRACT

A computing device and a method detect a lightness of a lighting device. The computing device captures an image of the lighting device and parses the image to obtain a pixel gray value of each lighting dot of the lighting device. The computing device obtains detection information of the lighting device according to the pixel gray value of each lighting dot of the lighting device. The computing device generates a detection report of the lighting device according to the detection information of the lighting device.

11 Claims, 6 Drawing Sheets

COMPUTING DEVICE AND METHOD FOR DETECTING LIGHTNESS OF LIGHTING DEVICE

CROSS-REFERENCE TO RELATED APPLICATIONS

This application claims priority to Chinese Patent Application No. 201410606857.8 filed on Oct. 31, 2014, the contents of which are incorporated by reference herein.

FIELD

The subject matter herein generally relates to image technology, and particularly to a computing device and a method for detecting functionality of a lighting device.

BACKGROUND

A light-emitting diode (LED) device typically includes a plurality of lighting dots for emitting light. Each lighting dot may need to be quality checked after the LED device has been manufactured. However, a user may need to visually check each lighting dot of the LED device.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY™, flash memory, and hard disk drives. The term "comprising" means "including, but not necessarily limited to"; it specifically indicates open-ended inclusion or membership in a so-described combination, group, series and the like.

Figure 1:
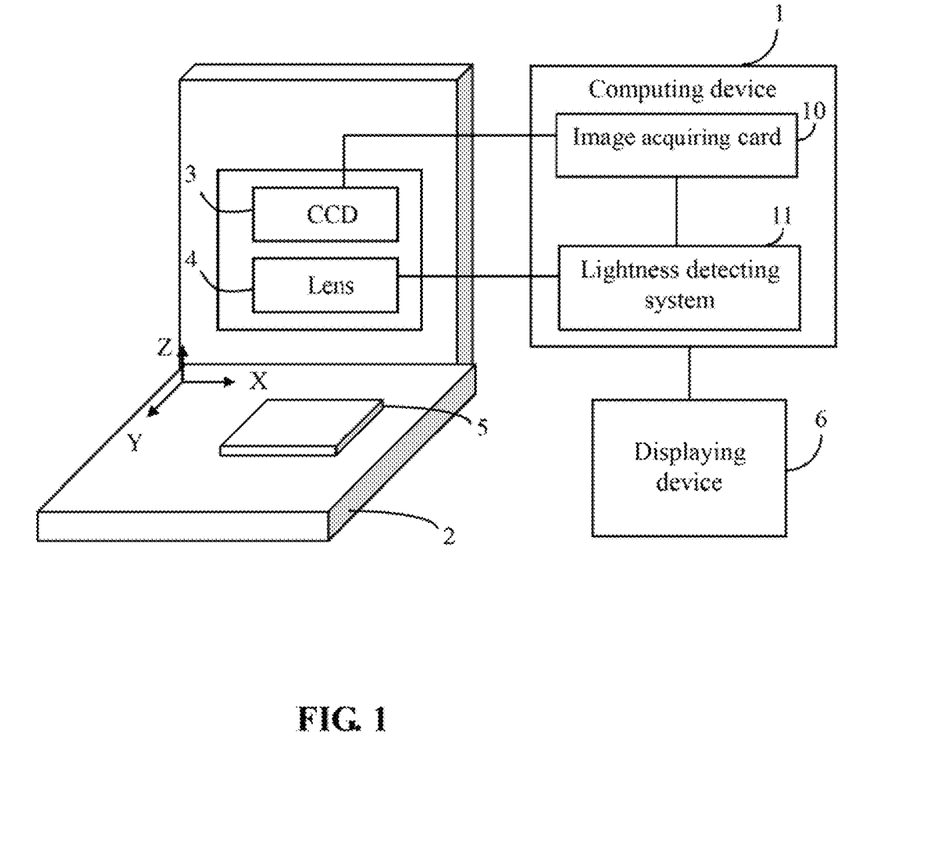
FIG. 1 is a diagrammatic view of an example embodiment of a computing device connected to a measurement machine.
Figure 3:
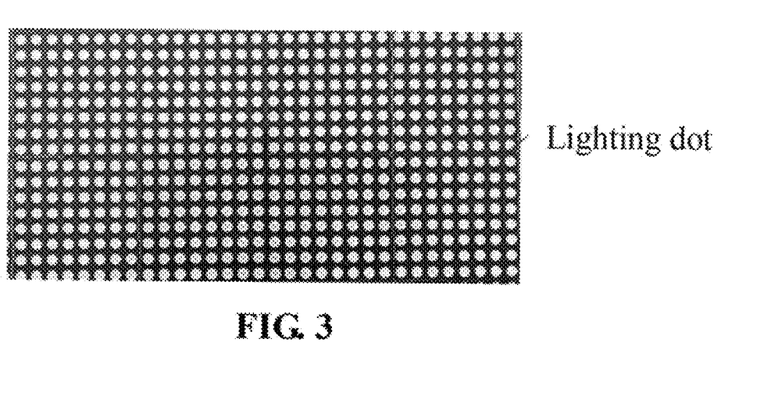
FIG. 3 shows a plan view of an example of an image of a lighting device.

FIG. 1 illustrates a block diagram of an example embodiment of a computing device 1. In at least the embodiment, the computing device 1 is connected to a measurement machine 2. In at least another embodiment, the computing device 1 can be integrated into the measurement machine 2. That is, the computing device 1 can be a part of the measurement machine 2. The measurement machine 2 can measure a lighting device 5 by capturing images of the lighting device 5. The lighting device 5 is positioned on a work platform of the measurement machine 2. A charge coupled device (CCD) 3 is movable along a Z-axis of the measurement machine 2, to capture consecutive images of the lighting device 5 using an optical lens 4 which is positioned in front of the CCD 3. The computer 1 comprises an image acquiring card 10 electronically connected to the CCD 3. The CCD 3 transfers the images of the lighting device 5 to the computing device 1 through the image acquiring card 10. The lighting device 5 can be, but is not limited to, a light-emitting diode (LED). The lighting device 5 is a matrix dot display which includes a plurality of lighting dots being capable of emitting light as shown in FIG. 3, the lighting dots are arranged in the lighting device 5. Each lighting dot is in a predetermined shape, such as, a circular shape, or a rectangle.

In at least one embodiment, the computing device 1 further provides various functional connections to connect with a displaying device 6, and an input device (for example, a keyboard and/or a mouse, not shown in FIG. 1). The computing device 1 provides a user interface, which is displayed on the displaying device 6. One or more operations of the computing device 1 can be controlled by a user through the user interface. For example, the user may input an ID and a password using the input device into the user interface to access the computing device 1. The displaying device 6 further displays the images of the lighting device 5, so that the images of the lighting device 5 can be visually checked by the user. The computing device 1 can be, but is not limited to, a tablet computer, a server, a personal computer or any other computing device. FIG. 1 illustrates only one example of the computing device 1, and other examples can comprise more or fewer components than those shown in the embodiment, or have a different configuration of the various components.

Figure 2:
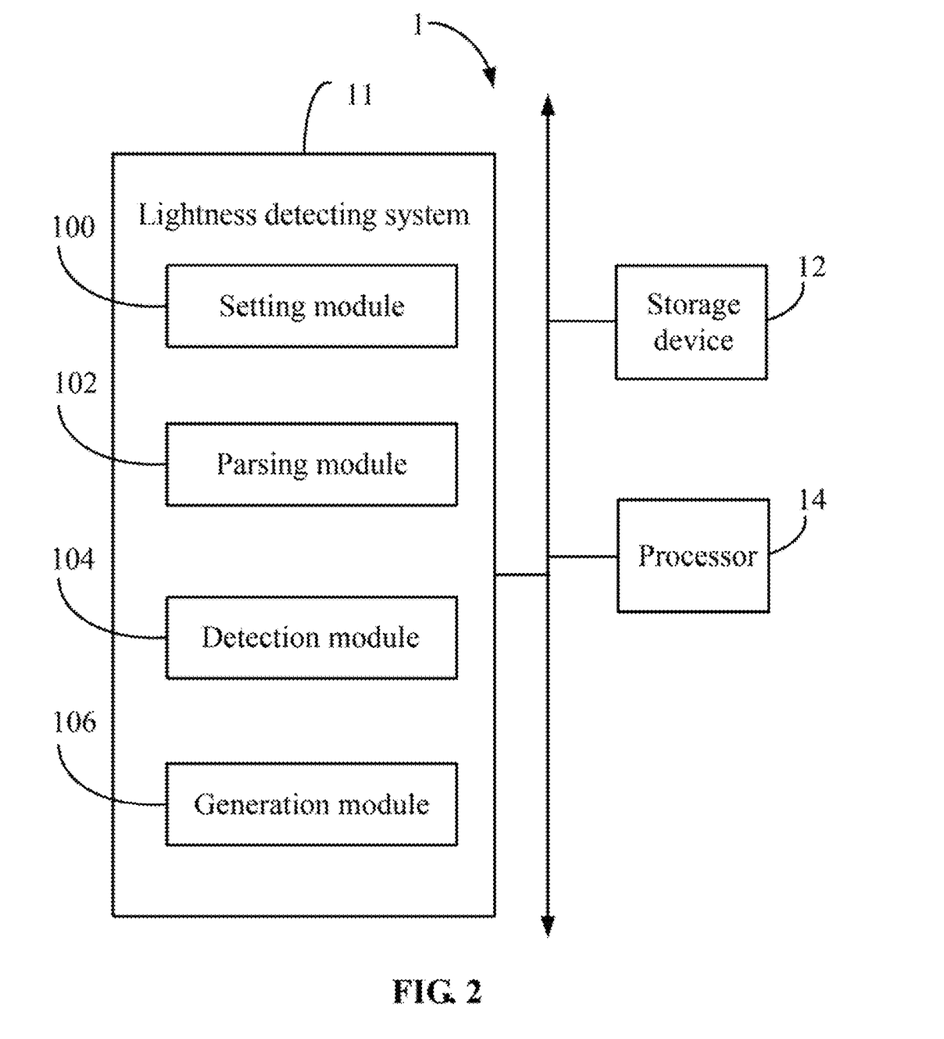
FIG. 2 is a block diagram of an example embodiment of a lightness detecting system included in the computing device.

FIG. 2 is a block diagram of an example embodiment of a lightness detecting system 11 included in the computing device 1. In at least one embodiment, the computing device 1 includes, but is not limited to, a lightness detecting system 10, a storage device 12, and at least one processor 14. In at least one embodiment, the storage device 12 can be an internal storage device, such as a flash memory, a random access memory (RAM) for temporary storage of information, and/or a read-only memory (ROM) for permanent storage of information. The storage device 12 can also be an external storage device, such as an external hard disk, a storage card, or a data storage medium. The at least one processor 14 can be a central processing unit (CPU), a microprocessor, or other data processor chip that performs functions of the computing device 1.

In at least one embodiment, the lightness detecting system 10 can include, but is not limited to, a setting module 100, a parsing module 102, a detection module 104, and a generation module 106. The modules 100-106 can comprise computerized instructions in the form of one or more computer-readable programs that can be stored in a non-transitory computer-readable medium, such as the storage device 12, and be executed by the at least one processor 14 of the computing device 1. Detailed descriptions of functions of the modules are given below in reference to FIG. 6.

Figure 6:
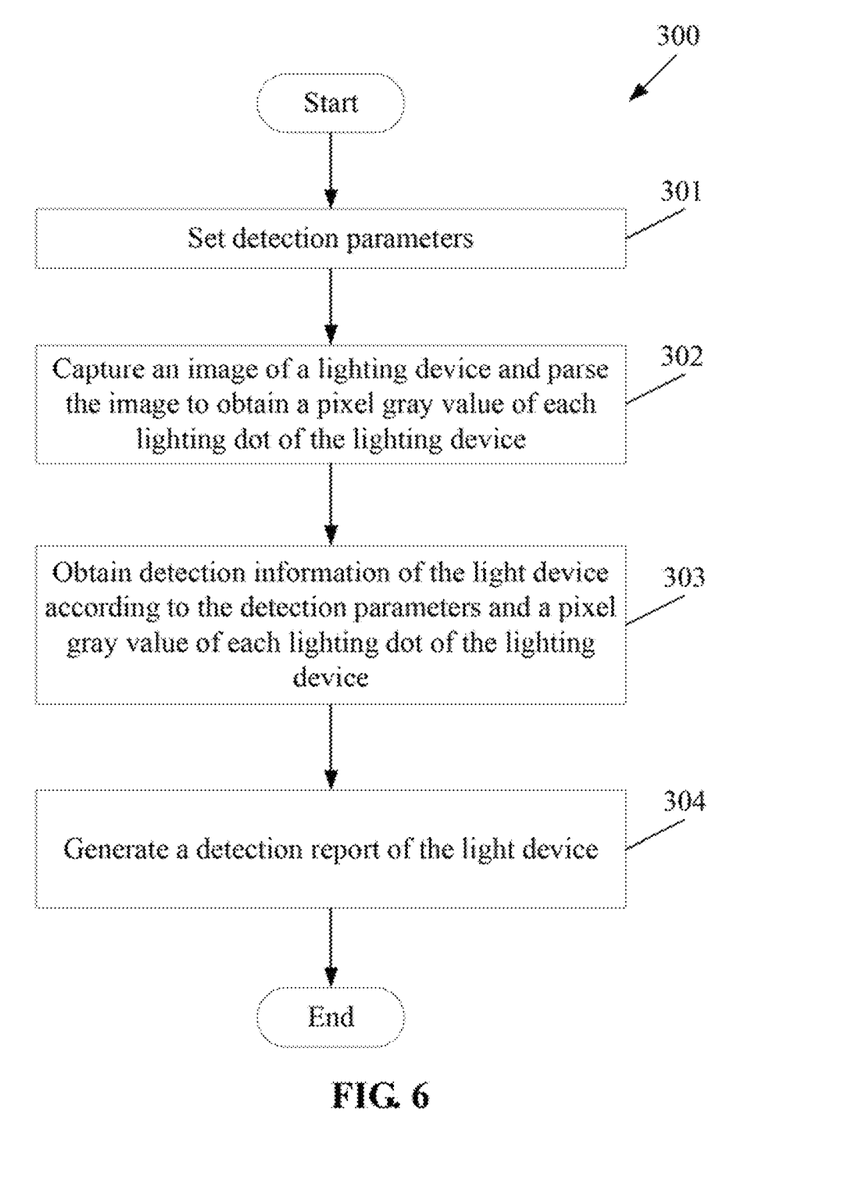
FIG. 6 is a flowchart of an example embodiment of a method for detecting a brightness of the lighting device.

FIG. 6 illustrates a flowchart of an example embodiment of a method for detecting a lightness of a lighting device. In an example embodiment, the method is performed by execution of computer-readable software program codes or instructions by at least one processor of a computing device.

Referring to FIG. 6, a flowchart is presented in accordance with an example embodiment. The method 300 is provided by way of example, as there are a variety of ways to carry out the method. The method 300 described below can be carried out using the configurations illustrated in FIG. 1, for example, and various elements of these figures are referenced in explaining example method 300. Each block shown in FIG. 6 represents one or more processes, methods, or subroutines, carried out in the method 300. Furthermore, the illustrated order of blocks is illustrative only and the order of the blocks can be changed. Additional blocks can be added or fewer blocks may be utilized without departing from this disclosure. The example method 300 can begin at block 301.

At block 301, the setting module 100 sets detection parameters of the lighting device 5. In at least one embodiment, the detection parameters of the lighting device 5 include a predetermined range of a pixel gray value, and a name of the lighting device 5.

At block 302, the parsing module 102 captures an image of the lighting device 5 and parses the image to obtain a pixel gray value of each lighting dot of the lighting device. In at least one embodiment, the CCD 3 is controlled by the parsing module 102 to capture the image of the lighting device 5. The parsing module 102 obtains an area of each lighting dot. The parsing module 102 calculates an amount of pixels which falls in the area of each lighting dot. The parsing module 102 parses the image of the lighting device 5 using a binary processing algorithm to generate pixel gray values of the pixels. The parsing module 102 calculates the pixel gray value of each lighting dot according to the pixel gray values of the pixels which falls within the area of the lighting dot. The pixel gray value of each lighting dot is an average of the pixel gray values of the pixels which falls within the area of the lighting dot.

Figure 4:
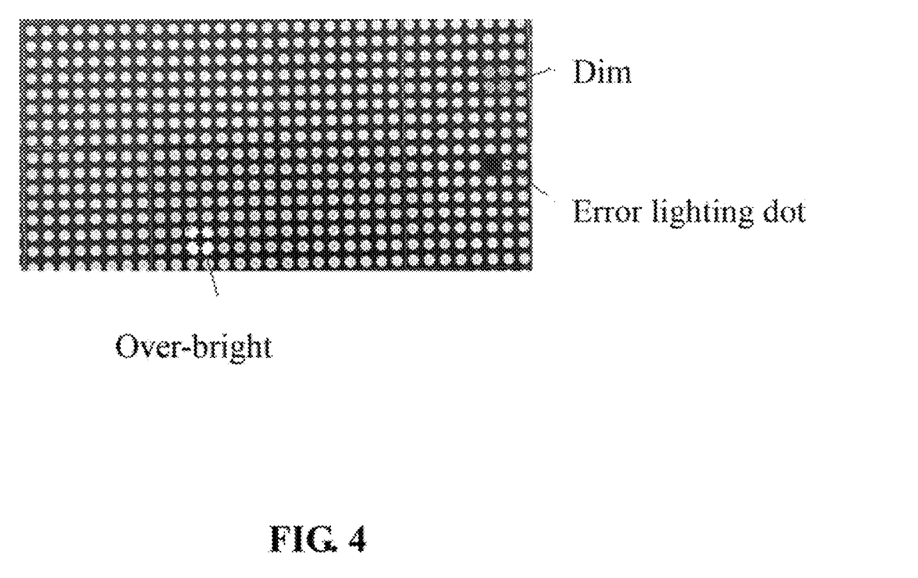
FIG. 4 shows a plan view of an example of detection information shown in the image of the lighting device.
Figure 5:
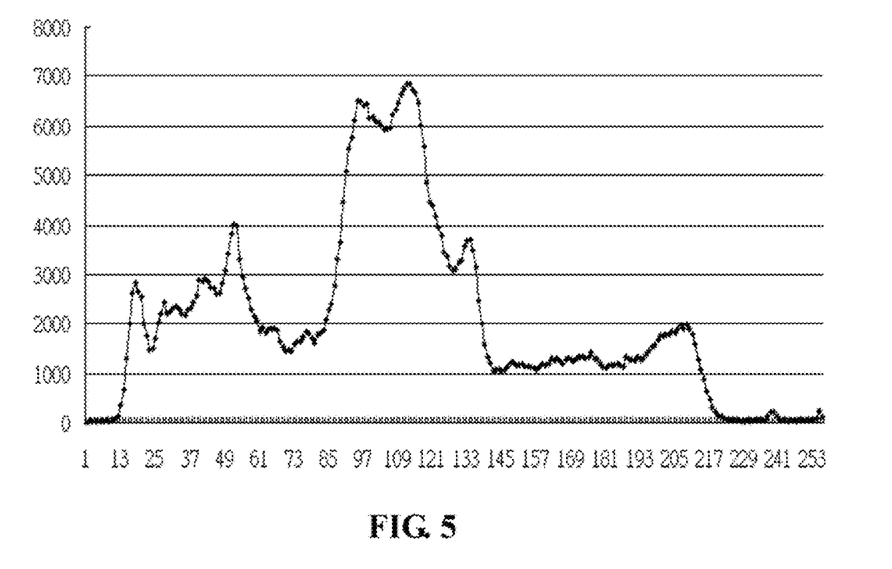
FIG. 5 shows a plan view of an example of a detection report of the lighting device.

At block 303, the detection module 104 obtains detection information of the lighting device 5 according to the detection parameters and the pixel gray value of each lighting dot of the lighting device 5. The detection information of the lighting device 5 includes the pixel gray value of each lighting dot, a maximum pixel gray value of the lighting dot, a minimum pixel gray value of each lighting dot, an amount of qualified lighting dots, an amount of unqualified lighting dots, a name of each unqualified lighting dot, a position of each unqualified lighting dot shown in the image of the lighting device 5 as shown in FIG. 4, a qualified rate of the lighting dots or the like. A lighting dot is determined as a qualified lighting dot upon a condition that the pixel gray value of the lighting dot falls within the predetermined range. A lighting dot is determined as an unqualified lighting dot upon a condition that the pixel gray value of the lighting dot falls outside the predetermined range. As shown in FIG. 5, the unqualified lighting dot can be a lighting dot which does not emit light, a lighting dot which its light is over bright, or a lighting dot which its light is dim.

At block 304, the calculation module 106 generates a detection report of the lighting device 5 according to the detection information of the lighting device 5. The detection report of the lighting device shows a relationship between the pixel gray values and the amount of the lighting dots. The detection report of the lighting device 5 can be a file in a format of a chart as shown in FIG. 5. As shown in FIG. 5, an abscissa of the chart represents pixel gray values, and an ordinate of the chart represents the amount of the lighting dots, the relationship between the pixel gray values and the amount of the lighting dots is checked visually by the chart. The detection report of the lighting device 5 can be a table which shows the relationship between the pixel gray values and the amount of the lighting dots. In at least one embodiment, the detection report of the lighting device 5 also comprises a date and a magnification when the detection report of the lighting device 5 is outputted.

The embodiments shown and a described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. A computing device comprising:
   at least one processor; and
   a storage device that stores one or more programs, which when executed by the at least one processor, cause the at least one processor to:
   set one or more detection parameters of a lighting device positioned on a work platform of a measurement machine coupled to the computing device; capture an image of the lighting device using a charge coupled device (CCD) of the measurement machine;
   parse the image to obtain a pixel gray value of each lighting dot of the lighting device;
   obtain detection information of the lighting device according to the detection parameters and the pixel gray value of each lighting dot of the lighting device, wherein the detection information of the lighting device comprises a maximum pixel gray value of the lighting dot, a minimum pixel gray value of each lighting dot, an amount of qualified lighting dots, an amount of unqualified lighting dots, a name of each unqualified lighting dot, a position of each unqualified lighting dot shown in the image of the lighting device, a qualified rate of the lighting dots, a predetermined range of the pixel gray value and a name of the lighting device;
   wherein the lighting dot is determined as a qualified lighting dot upon a condition that the pixel gray value of the lighting dot falls within the predetermined range; and wherein the lighting dot is determined as an unqualified lighting dot upon a condition that the pixel gray value of the lighting dot falls outside the predetermined range; and generate a detection report of the lighting device according to the detection information of the lighting device.

2. The computing device of claim 1, wherein a pixel gray value of each lighting dot of the lighting device is obtained by:

obtaining an area of each lighting dot of the lighting device;

calculating an amount of pixels which falls in the area of each lighting dot;

parsing the image of the lighting device using a binary processing algorithm to generate pixel gray values of the pixels; and calculating the pixel gray value of each lighting dot according to the pixel gray values of the pixels which falls within the area of the lighting dot.

3. The computing device of claim 2, wherein the pixel gray value of each lighting dot is an average of the pixel gray values of the pixels which falls within the area of the lighting dot.

4. The computing device of claim 1, wherein the detection report of the lighting device shows a relationship between the pixel gray values of the lighting device and an amount of the lighting dots.

5. A computer-based method for detecting a of a lighting device using a computing device, the method comprising at least one processor of the computing device executing the steps of:

setting one or more detection parameters of the lighting device positioned on a work platform of a measurement machine coupled to the computing device;

capturing an image of the lighting device using a charge coupled device (CCD) of the measurement machine and receiving the image of the lighting device transferred from the charge coupled device through an image acquiring card of the computing device;

parsing the image to obtain a pixel gray value of each lighting dot of the lighting device;

obtaining detection information of the lighting device according to the detection parameters and the pixel gray value of each lighting dot of the lighting device, wherein the detection information of the lighting device comprises a maximum pixel gray value of the lighting dot, a minimum pixel gray value of each lighting dot, an amount of qualified lighting dots, an amount of unqualified lighting dots, a name of each unqualified lighting dot, a position of each unqualified lighting dot shown in the image of the lighting device, and a qualified rate of the lighting dots, a predetermined range of the pixel gray value and a name of the lighting device;

wherein the lighting dot is determined as a qualified lighting dot upon a condition that the pixel gray value of the lighting dot falls within the predetermined range; and wherein the lighting dot is determined as an unqualified lighting dot upon a condition that the pixel gray value of the lighting dot falls outside the predetermined range; and generating a detection report of the lighting device according to the detection information of the lighting device.

6. The method of claim 5, wherein a pixel gray value of each lighting dot of the lighting device is obtained by:

obtaining an area of each lighting dot of the lighting device;

calculating an amount of pixels which falls in the area of each lighting dot;

parsing the image of the lighting device using a binary processing algorithm to generate pixel gray values of the pixels; and calculating the pixel gray value of each lighting dot according to the pixel gray values of the pixels which falls within the area of the lighting dot.

7. The method of claim 6, wherein the pixel gray value of each lighting dot is an average of the pixel gray values of the pixels which falls within the area of the lighting dot.

8. The method of claim 5, wherein the detection report of the lighting device shows a relationship between the pixel gray values of the lighting device and an amount of the lighting dots.

9. A non-transitory computer-readable medium having stored thereon instructions that, when executed by at least one processor of a computing device, causing the computing device to perform a method for detecting a brightness of a lighting device, the method comprising:

setting one or more detection parameters of the lighting device positioned on a work platform of a measurement machine coupled to the computing device;

capturing an image of the lighting device using a charge coupled device (CCD) of the measurement machine;

parsing the image to obtain a pixel gray value of each lighting dot of the lighting device;

obtaining detection information of the lighting device according to the detection parameters and the pixel gray value of each lighting dot of the lighting device, wherein the detection information of the lighting device comprises a maximum pixel gray value of the lighting dot, a minimum pixel gray value of each lighting dot, an amount of qualified lighting dots, an amount of unqualified lighting dots, a name of each unqualified lighting dot, a position of each unqualified lighting dot shown in the image of the lighting device, and a qualified rate of the lighting dots, a predetermined range of the pixel gray value and a name of the lighting device;

wherein the lighting dot is determined as a qualified lighting dot upon a condition that the pixel gray value of the lighting dot falls within the predetermined range; and wherein the lighting dot is determined as an unqualified lighting dot upon a condition that the pixel gray value of the lighting dot falls outside the predetermined range; and generating a detection report of the lighting device according to the detection information of the lighting device.

10. The non-transitory computer-readable medium of claim 9, wherein a pixel gray value of each lighting dot of the lighting device is obtained by:

obtaining an area of each lighting dot of the lighting device;

calculating an amount of pixels which falls in the area of each lighting dot;

parsing the image of the lighting device using a binary processing algorithm to generate pixel gray values of the pixels; and calculating the pixel gray value of each lighting dot according to the pixel gray values of the pixels which falls within the area of the lighting dot.

11. The non-transitory computer-readable medium of claim 10, wherein the pixel gray value of each lighting dot is an average of the pixel gray values of the pixels which falls within the area of the lighting dot.

* * * * *